United States Patent
Lynas

(10) Patent No.: US 8,157,211 B2
(45) Date of Patent: Apr. 17, 2012

(54) AIRCRAFT TOILET FACILITY

(75) Inventor: Christopher Lynas, Bristol (GB)

(73) Assignee: Airbus Operations Limited, Bristol (GB)

( * ) Notice: Subject to any disclaimer, the term of this patent is extended or adjusted under 35 U.S.C. 154(b) by 344 days.

(21) Appl. No.: 12/596,985

(22) PCT Filed: Apr. 23, 2008

(86) PCT No.: PCT/GB2008/050284
§ 371 (c)(1), (2), (4) Date: Oct. 22, 2009

(87) PCT Pub. No.: WO2008/139212
PCT Pub. Date: Nov. 20, 2008

(65) Prior Publication Data
US 2010/0155531 A1    Jun. 24, 2010

(30) Foreign Application Priority Data
May 9, 2007  (GB) .................................. 0708891.7

(51) Int. Cl.
*B64D 11/00* (2006.01)
(52) U.S. Cl. ................................... 244/118.5
(58) Field of Classification Search ............... 244/118.5
See application file for complete search history.

(56) References Cited

U.S. PATENT DOCUMENTS

| | | | | |
|---|---|---|---|---|
| 5,063,859 A | * | 11/1991 | Rader | 105/340 |
| 5,150,863 A | | 9/1992 | Hozumi | |
| 5,474,260 A | * | 12/1995 | Schwertfeger et al. | 244/118.5 |
| 5,992,797 A | * | 11/1999 | Seidel et al. | 244/118.5 |
| 6,464,169 B1 | * | 10/2002 | Johnson et al. | 244/118.5 |
| 6,615,421 B2 | | 9/2003 | Itakura | |
| 6,957,990 B2 | * | 10/2005 | Lowe | 440/6 |
| 7,222,820 B2 | | 5/2007 | Wentland et al. | |

FOREIGN PATENT DOCUMENTS

| | | |
|---|---|---|
| EP | 1209078 A2 | 5/2002 |
| JP | 6-040399 | 2/1994 |
| WO | 20041076279 A2 | 9/2004 |

OTHER PUBLICATIONS

ISR and Written Opinion for PCT/GB2008/050284 mailed Jul. 17, 2008.

* cited by examiner

*Primary Examiner* — Tien Dinh
*Assistant Examiner* — Michael A Fabula
(74) *Attorney, Agent, or Firm* — Lowe, Hauptman, Ham & Berner, LLP

(57) ABSTRACT

The invention relates to an aircraft toilet facility, particularly an aircraft toilet facility on a single passenger-deck aircraft. The invention provides a first toilet unit situated at least partially in the space below the floor of a passenger deck of the aircraft, and a second toilet unit situated at least partially in the space above the ceiling of the passenger deck. The first toilet unit is proximate the second toilet unit, and both the first toilet unit and second toilet unit are accessible from the passenger deck.

16 Claims, 8 Drawing Sheets

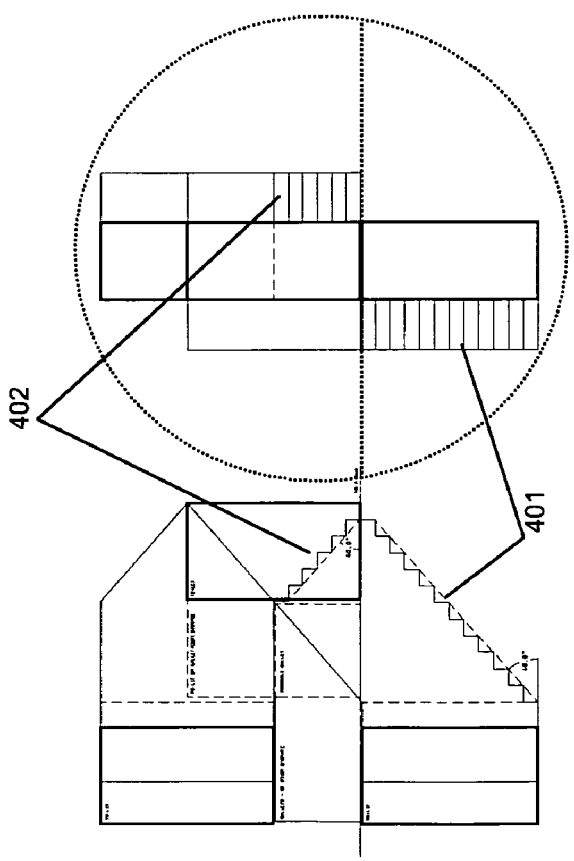
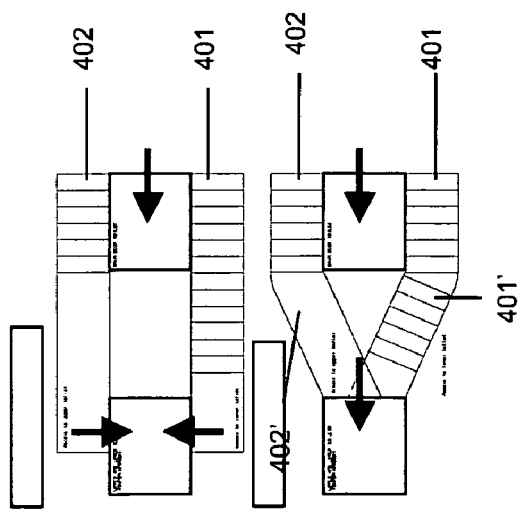
Fig. 4
Fig. 5
Fig. 6
Fig. 7

AIRCRAFT TOILET FACILITY

RELATED APPLICATIONS

The present application is based on International Application Number PCT/GB2008/050284 filed Apr. 23, 2008, and claims priority from British Application Number 0708891.7 filed May 9, 2007, the disclosures of which are hereby incorporated by reference herein in their entirety.

BACKGROUND OF THE INVENTION

This invention relates to an aircraft toilet facility, more particularly, but not exclusively, an aircraft toilet facility on an aircraft with a single passenger deck.

Aircraft, particularly commercial passenger aircraft, need to strike a balance between the number of passengers that they can carry, and the comfort in which those passengers are carried. For example, it is desirable to have a certain number of toilets on the aircraft depending on the number of passengers it is designed to carry. However, the greater the number of toilets an aircraft carries, the greater the volume of cabin space taken up by the toilets. This reduces the number of passengers that may be seated in the aircraft cabin, thereby making the aircraft potentially less profitable for the aircraft operator. Aircraft for which this may particularly pose a problem include large, single passenger deck aircraft. Aircraft typical of this class have dimensions of between, for example, 50 m to 90 m in length, with a cabin width of between 4 m and 6 m.

The present invention seeks to mitigate or overcome one or more of the above-identified disadvantages associated with the prior art. Alternatively or additionally, the invention seeks to reduce the floor space in an aircraft cabin taken up by the aircraft toilet facilities.

SUMMARY OF THE INVENTION

The invention provides an aircraft toilet facility comprising:

a first toilet unit situated at least partially in the space below the floor of a passenger deck of the aircraft, and a second toilet unit situated at least partially in the space above the ceiling of the passenger deck, the first toilet unit being proximate the second toilet unit, and the first toilet unit and second toilet unit being accessible from the passenger deck.

The first and second toilet units may form a single module.

The first toilet unit may be at least partially in vertical alignment with the second toilet unit. The vertical direction is defined as that perpendicular to the floor of the passenger deck, the passenger deck defining the horizontal direction. That the first toilet unit is at least partially in vertical alignment with the second toilet unit means that at least some part of the first toilet is directly beneath, in the vertical direction, at least some part of the second toilet unit. Certain embodiments of the invention take advantage of the space in the aircraft body both above and below an aircraft passenger deck. The invention may be of particular benefit to the large, single passenger deck wide-bodied aircraft as mentioned above. For example, the aircraft may be between 50 m and 90 m in length and have a cabin width of between 4 m and 6 m. In large aircraft the sum of the under-floor space, the above-ceiling space and the cabin height may be sufficient to accommodate two toilet units, one above the other.

DESCRIPTION OF THE DRAWINGS

FIG. 4 shows a lengthwise cross sectional view of an aircraft body including a toilet facility according a second embodiment of the invention;

FIG. 5 shows a sideways cross sectional view of the toilet facility according to the second embodiment of the invention;

FIG. 6 shows a plan view of the toilet facility according to the second embodiment of the invention;

FIG. 7 shows a plan view of an alternative arrangement of the second embodiment of the invention;

DETAILED DESCRIPTION

Figure 1:
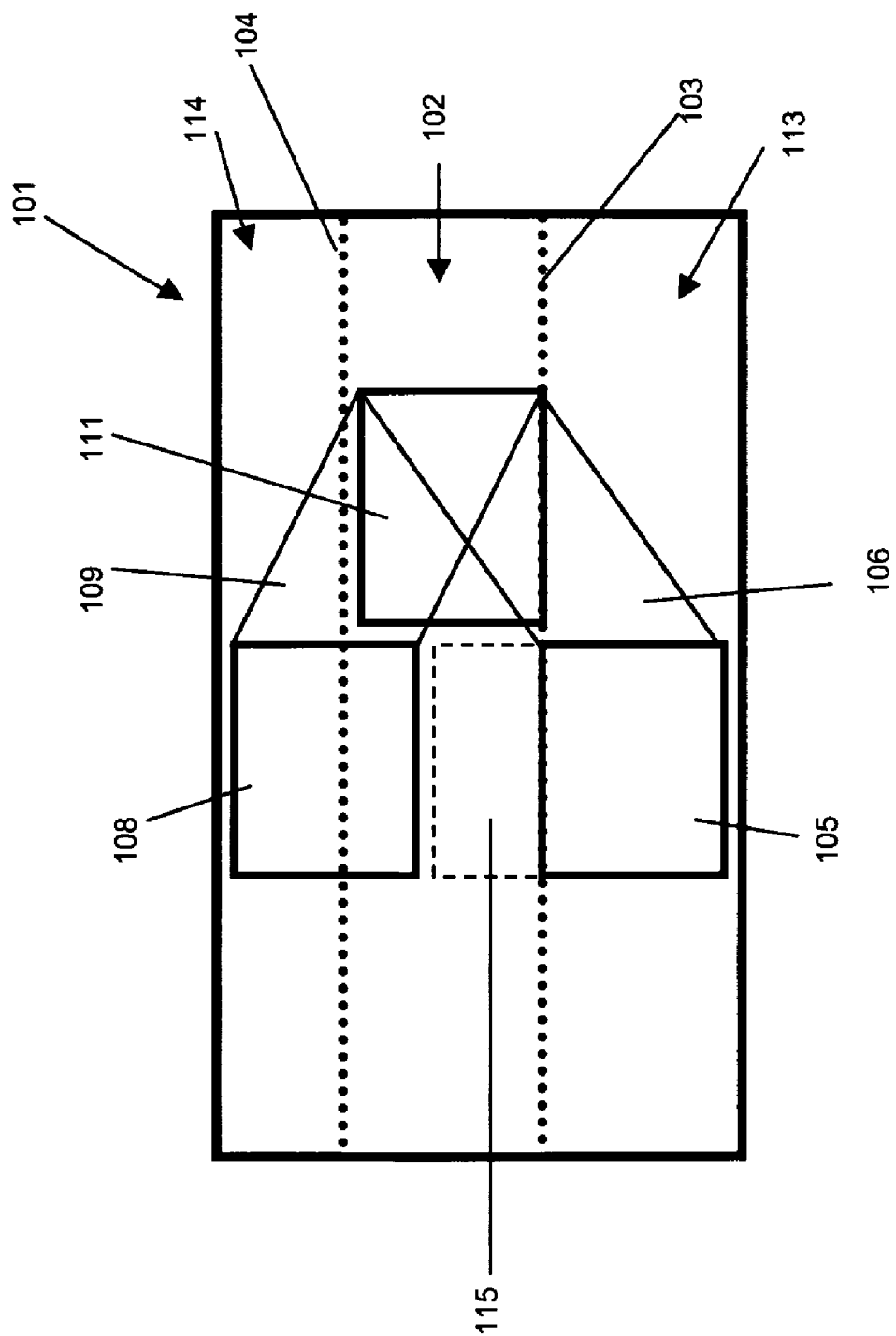
FIG. 1 shows a lengthwise cross sectional view of an aircraft body including a toilet facility according to a first embodiment of the invention.
Figure 2:
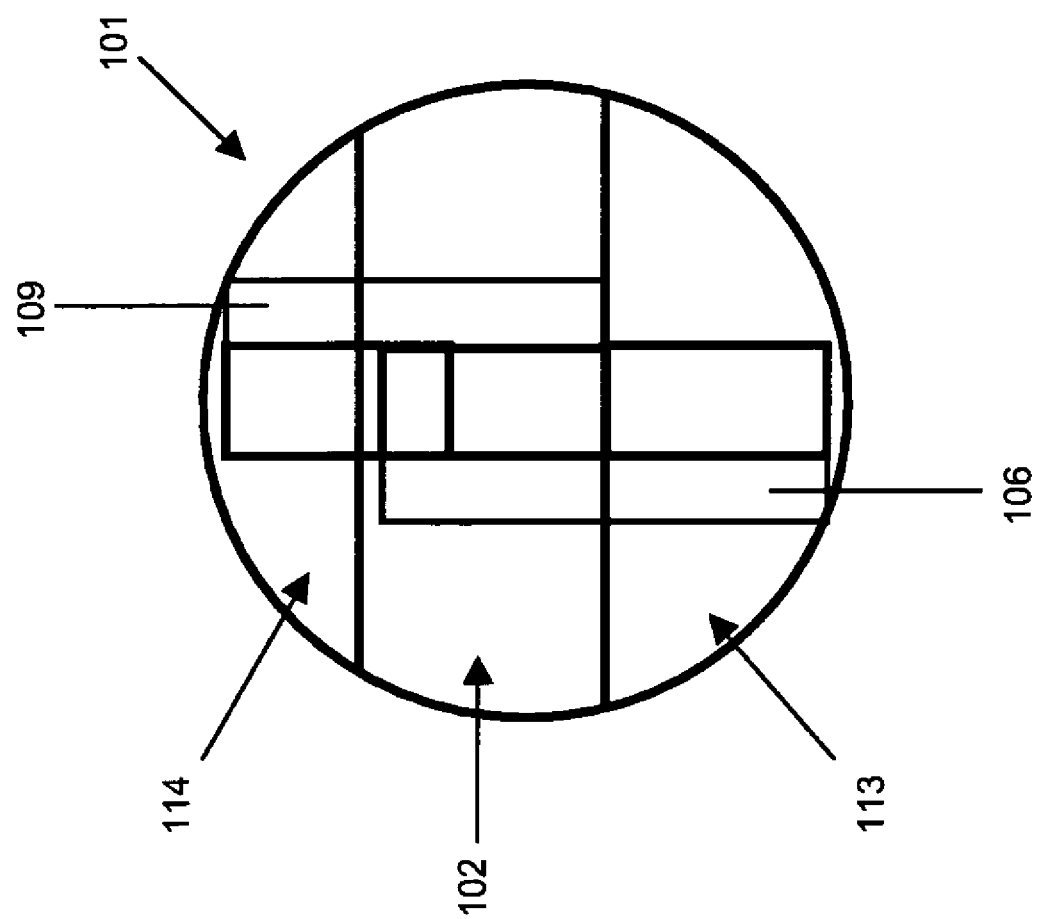
FIG. 2 shows a sideways cross sectional view of the toilet facility according to the first embodiment of the invention.
Figure 3:
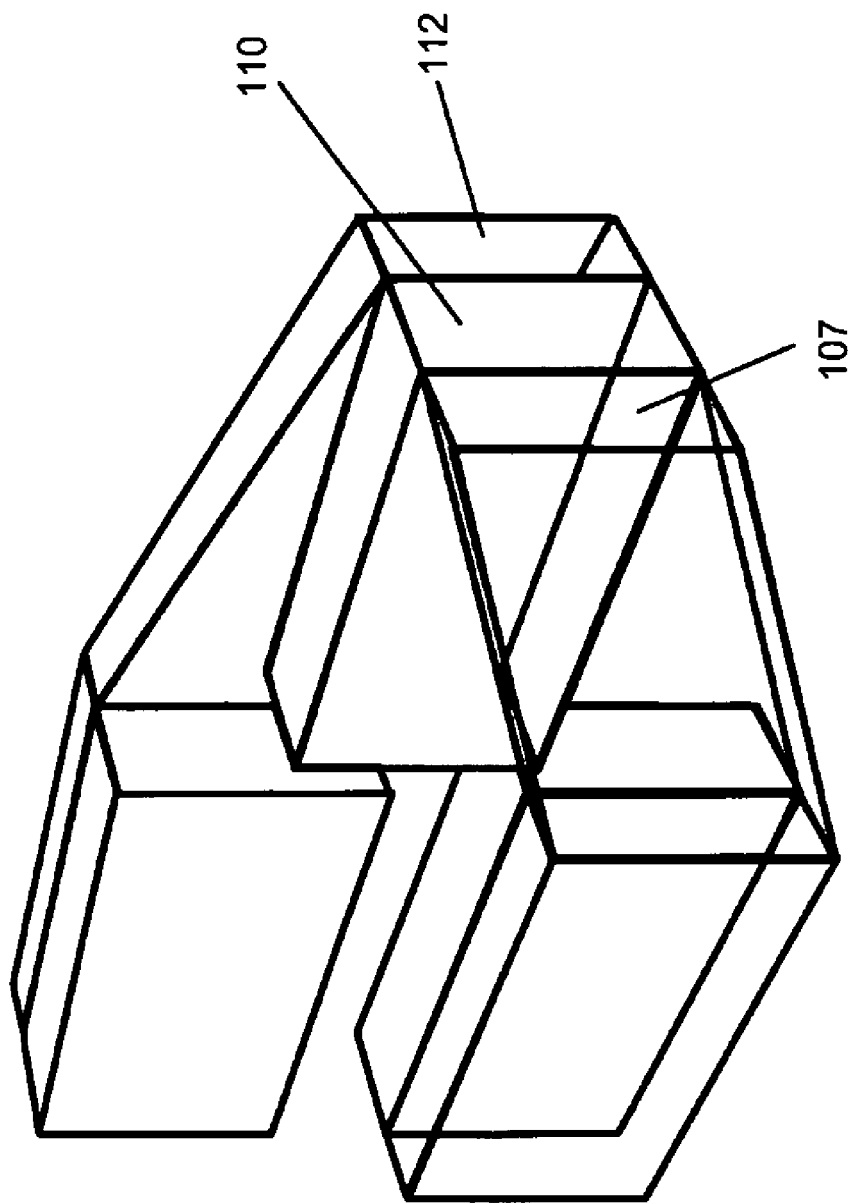
FIG. 3 shows a three dimensional view of the toilet facility according to the first embodiment of the invention.

FIGS. 1, 2, and 3, show an aircraft body 101, the aircraft body including a passenger deck 102, the passenger deck defined by a floor 103 and a ceiling 104, a first toilet unit 105, a first ramp 106, a first door 107, a second toilet unit 108, a second ramp 109, a second door 110, a third toilet unit 111 and a third door 112. The aircraft body further includes an under-floor area 113 and an above-ceiling area 114 and a storage area 115.

The toilet units may include any or all of the following elements, a toilet, a urinal, a wash basin, a hand drying facility, and a baby changing facility. Preferably, the toilet units include a toilet. The toilet units making up the aircraft toilet facility may be of the same type or different.

The first toilet unit 105 is located such that it is entirely beneath the floor 103 of the passenger deck 102 in the under-floor area 113. A first ramp 106 leads, via a first door 107, down from the passenger deck 102 to the first toilet unit 105. The first toilet unit 105 may be directly accessible via the ramp, or there may be an additional door in the side of the first toilet unit 105 which provides access. In an alternative embodiment, the first toilet unit 105 may be located such that it extends into the passenger deck 102 of the aircraft.

The second toilet unit 108 is located in direct vertical alignment above the first toilet unit 105 and partially within the above-ceiling space 114 (as shown best in FIG. 2). A second ramp 109 leads, via a second door 110, up from the passenger deck 102 to the second toilet unit 108. The second toilet unit 108 may be directly accessible via the ramp, or there may be an additional door in the side of the second toilet unit 108 which provides access. In a preferred embodiment the slope of the ramps 106 and 109 is approximately 20 degrees to the horizontal.

The arrangement of the first toilet unit 105 and second toilet unit 108 in this embodiment results in the two toilet units using the amount of cabin space usually associated with a single toilet unit. More particularly, the floor space taken up on the passenger deck 102 by the first toilet unit 106 and second toilet unit 108 is the same as that usually taken up by a single toilet unit. The dimensions of a toilet unit may be around 2 m in height, 1 m wide, and 1 m deep.

This first embodiment also shows a third toilet unit 111, fully located between the floor 103 and ceiling 104. The third toilet unit 111 is aligned in the same vertical plane as the first toilet unit 105 and second toilet unit 108. The third door 112 provides access to the third toilet unit 111 and the all three doors 107, 110, and 112, are located next to each other. Therefore, a passenger, when wanting to use the toilet facility, is presented with three doors next to each other.

As can be seen in FIG. 1, the arrangement of the first toilet unit and second toilet unit may be such that storage space 115 is provided between the units. There may be a gap of 0 mm to the height sufficient to include a further toilet unit between the top of the first toilet unit 105 and the bottom of the second toilet 108. Preferably, the storage space is accessible while the aircraft is flying. It may be accessible to the aircraft crew and/or the aircraft passengers. For example, the storage space may be used as an aircraft galley. In order that the storage space may be used as an aircraft galley the storage space should have dimensions greater than 305 mm×805 mm×1040 mm (typical aircraft trolley dimensions), preferably with a height of 1070 mm and a width clearance of 2×35 mm and length clearance of 21 mm if more than one trolley is to be stored in the storage space. The working clearance outside the galley area should be at least the length of the trolley used plus 50 mm in order to allow for trolley extraction. Further storage areas may be found by utilising the space above the first ramp 106 and below the second ramp 109. Alternatively, the additional space 115 may be used to provide sleeping or individual seating areas.

An advantage of clustering toilet units together as described may be that the pipe system connecting the toilet units to the aircraft waste storage tanks is simplified, thereby reducing manufacturing complexity and possibly resulting in a weight saving.

FIGS. 4 and 5 show a second embodiment of the invention, with a layout similar to that of the first embodiment, but the access to the first and second toilet units being provided by a first set of stairs 401 and a second set of stairs 402. An additional passenger deck level toilet may be included in the space 403. This may require the first and second toilet units to be offset away from the passenger deck level toilets in order to allow access from the passenger deck.

FIG. 6 shows a plan view of the second embodiment of the invention, as shown in FIGS. 4 and 5, where the first stair set 401 provides access (as indicated by arrows) to the side of the first toilet unit, and the second stair set 402 provides access to the side of the second toilet unit.

FIG. 7 shows plan view of an alternative to the second embodiment of the invention, where the first stair set 401 and the second stair set 402 include bends 401' and 402'. The stair sets now provide access to the front of the toilet units (as indicated by an arrow). Advantageously, the first and second toilet unit may be front entry toilet units. This alternative to the second embodiment is equally applicable to the first embodiment as described above, where the ramps include a bend.

Figure 8:
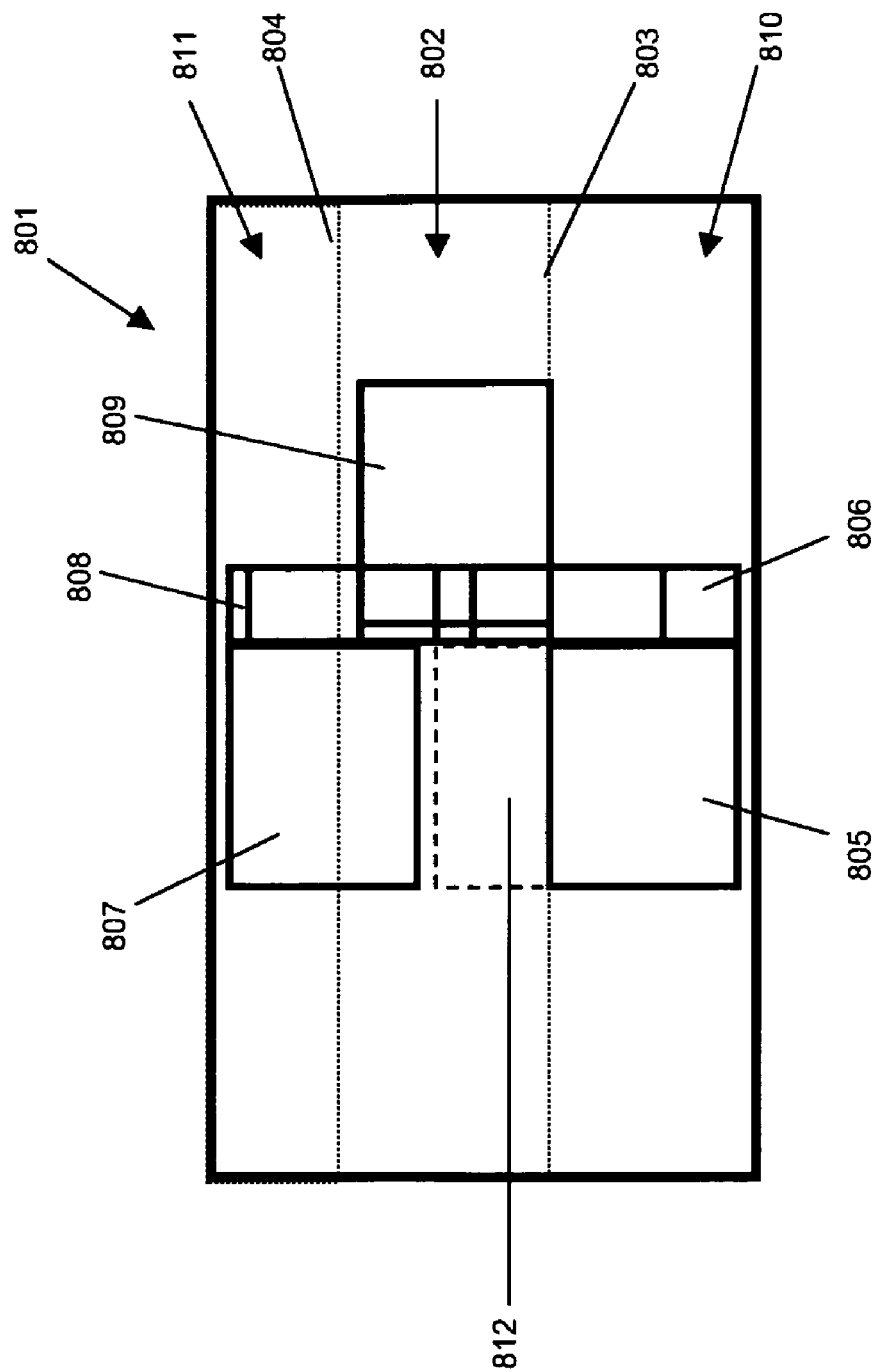
FIG. 8 shows a lengthwise cross sectional view of an aircraft body including a toilet facility according to a third embodiment of the invention
Figure 9:
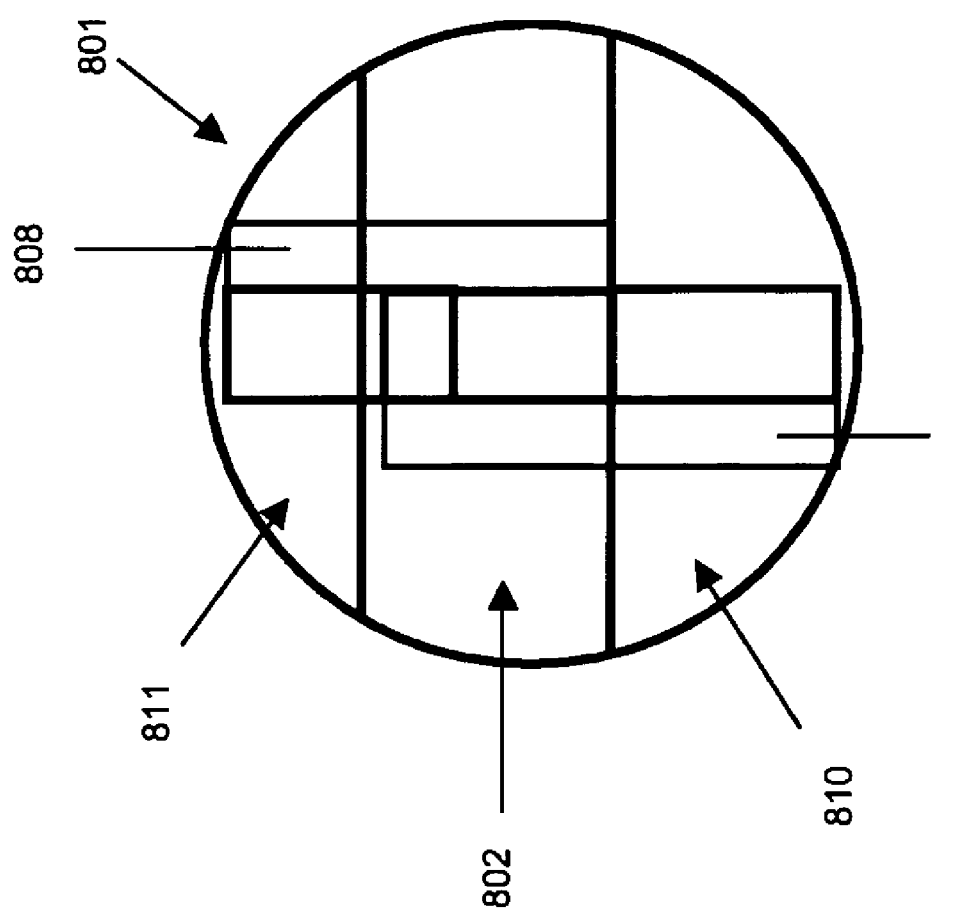
FIG. 9 shows a sideways cross sectional view of the toilet facility according to the third embodiment of the invention.
Figure 10:
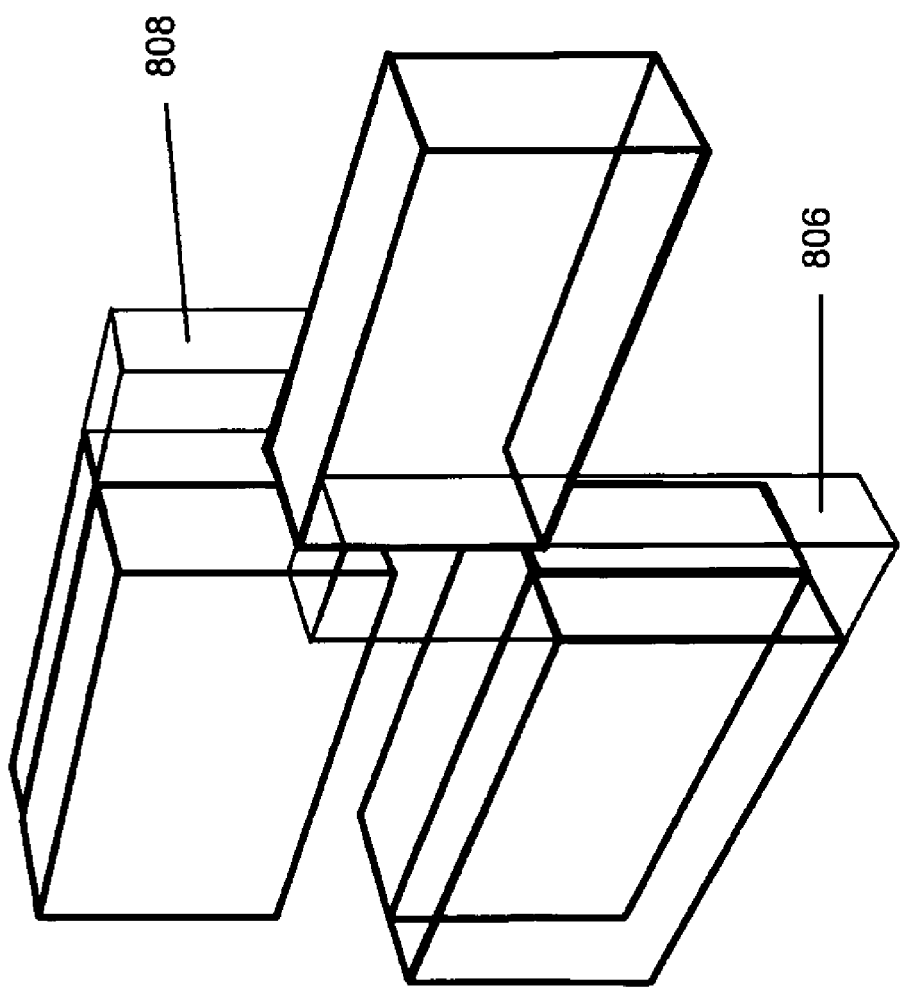
FIG. 10 shows a three dimensional view of the toilet facility according to the third embodiment of the invention.

FIGS. 8, 9, and 10, show a third embodiment of the invention. The embodiment features an aircraft body 801, the aircraft body including a passenger deck 802, the passenger deck defined by a floor 803 and a ceiling 804, a first toilet unit 805, a second toilet unit 807 and a third toilet unit 809, arranged with the same configuration as described for the first embodiment of the invention. The aircraft body further includes an under-floor area 810 and an above-ceiling area 811 and a storage area 812. However, the first toilet unit 805 is accessed via a first single-person lift 806. The first single-person lift is capable of taking a person from the passenger deck 802 down to the first toilet unit 805 and then returning them back to the passenger deck 802. The first single-person lift 806 is located to the side of the third toilet unit 809 and may provide direct access to the first toilet unit 805 or the first toilet unit 805 may include a door which provides access.

The second toilet unit 807 is accessed by a second single-person lift 808. The second single-person lift 808 is capable of taking a person from the passenger deck 802 down to the second toilet unit 807 and then returning them back to the passenger deck 802. The second single-person lift 808 is located to the opposite side of the third toilet unit 809 than the first single-person lift 806 and may provide direct access to the second toilet unit 807.

Advantageously, the single-person lifts take up very little cabin space, further increasing the cabin space savings made by the invention.

Figure 11:
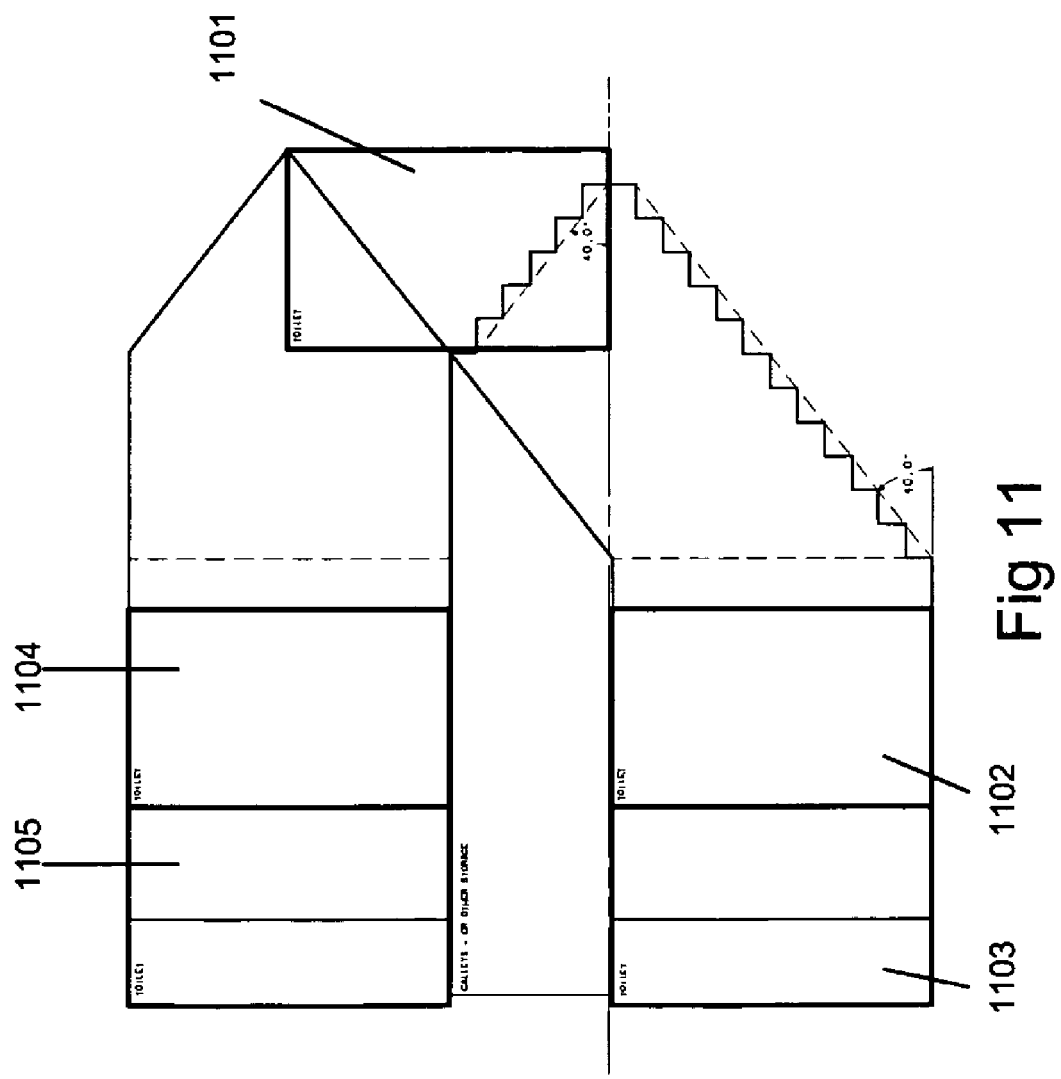
FIG. 11 shows a fourth embodiment of the invention, including additional toilet units.

FIG. 11 shows a fourth embodiment of the invention, comprising a first toilet unit 1101, a second toilet unit 1102, a third toilet unit 1103, a fourth toilet unit 1104 and a fifth toilet unit 1105. The arrangement is similar to that shown in FIGS. 4 and 5 as described above, with the addition of a the third toilet unit 1103 located beneath the floor of the passenger deck and the fifth toilet unit 1105 located in vertical alignment with the third toilet unit 1103 and partially within the above-ceiling space. In an alternative embodiment, access to the toilet units provided at least partially located in the space above or below the passenger deck may be provided by a ramp, as described in relation to FIGS. 1 to 3.

It will of course be appreciated that features described in relation to one embodiment of the present invention may be incorporated into other embodiments of the present invention.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The above described embodiments include at least three toilet units. The aircraft toilet facility may comprise only three toilet units. Alternatively, the toilet facility of the invention may comprise only two toilet units. Also, while in the above described embodiments, the first toilet unit is located in direct vertical alignment with the second toilet unit, in further embodiments there may be an offset between the first toilet unit and second toilet unit. A further alternative embodiment includes either or both of the first toilet unit and the second toilet unit being situated at least partially between the floor and ceiling of the passenger deck.

The above described embodiments include the first toilet unit being in vertical alignment with the second toilet unit. The embodiments may be modified so that the toilet units are only partially in vertical alignment or not in vertical alignment.

In a further embodiment, the toilet units may be formed as part of the same toilet module.

The invention may also provide an aircraft including a toilet facility as described above. The aircraft may be a single passenger deck aircraft. The aircraft may be between 50 m to 90 m long, alternatively, the aircraft may be over 50 m long. The aircraft may have a cabin width of between 4 m and 6 m, alternatively the cabin width may be over 5 m.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft toilet facility comprising:
   a first toilet enclosure situated at least partially in the space below the floor of a passenger deck of the aircraft, and
   a second toilet enclosure situated at least partially in the space above the ceiling of the passenger deck,
   wherein the first toilet enclosure or second toilet enclosure is situated at least partially between the floor and ceiling of the passenger deck,
   the first toilet enclosure being proximate the second toilet enclosure, and
   the first toilet enclosure and the second toilet enclosure being accessible from the passenger deck.

2. An aircraft toilet facility as claimed in claim 1, wherein the first toilet enclosure and second toilet enclosure form a single toilet module.

3. An aircraft toilet facility as claimed in claim 1, wherein the first toilet enclosure is at least partially in vertical alignment with the second toilet enclosure.

4. An aircraft toilet facility as claimed in claim 1, comprising no more than two toilet enclosures.

5. An aircraft toilet facility as claimed in claim 1, comprising a third toilet enclosure fully situated between the floor and ceiling of the passenger deck.

6. An aircraft toilet facility as claimed in claim 5, comprising no more than three toilet enclosures.

7. An aircraft toilet facility as claimed in claim 1, comprising a fourth toilet enclosure located either at least partially in the space below the passenger deck of the aircraft or at least partially in the space above the ceiling of the passenger deck.

8. An aircraft toilet facility as claimed in claim 1, wherein the first toilet enclosure is in full vertical alignment with the second toilet enclosure.

9. An aircraft toilet facility as claimed in claim 1, comprising stairs providing access to at least one of the first toilet enclosure or the second toilet enclosure from the passenger deck.

10. An aircraft toilet facility as claimed in claim 1, comprising a ramp providing access to at least one of the first toilet enclosure or the second toilet enclosure from the passenger deck.

11. An aircraft toilet facility as claimed in claim 1, comprising a lift providing access to at least one of the first toilet enclosure or the second toilet enclosure from the passenger deck.

12. An aircraft toilet facility as claimed in claim 1, comprising a storage area located between the first toilet enclosure and second toilet enclosure.

13. An aircraft including a toilet facility as claimed in claim 1.

14. An aircraft according to claim 13, comprising a single passenger deck aircraft.

15. An aircraft as claimed in claim 13, wherein the aircraft has a passenger cabin width of over 5 m.

16. An aircraft as claimed in claim 13, wherein the aircraft is over 50 m long.

* * * * *